United States Patent [19]

Umeda

[11] Patent Number: 5,036,175
[45] Date of Patent: Jul. 30, 1991

[54] WELDING GUN HAVING EQUALIZING FUNCTION

[75] Inventor: Shigeru Umeda, Kanagawa, Japan
[73] Assignee: Obara Corporation, Tokyo, Japan
[21] Appl. No.: 528,924
[22] Filed: May 25, 1990
[51] Int. Cl.⁵ .............................................. B23K 11/10
[52] U.S. Cl. .................................................... 219/89
[58] Field of Search ......................... 219/86.25, 89, 90

[56] References Cited

U.S. PATENT DOCUMENTS

| | | | |
|---|---|---|---|
| 3,299,247 | 1/1967 | Waltonen | 219/90 |
| 4,410,782 | 10/1983 | Konno et al. | 219/89 |
| 4,458,131 | 7/1984 | Challenger | 219/89 |
| 4,531,041 | 7/1985 | Larsson | 219/90 |

*Primary Examiner*—Clifford C. Shaw
*Attorney, Agent, or Firm*—Flynn, Thiel, Boutell & Tanis

[57] ABSTRACT

A welding gun comprises a base having a stopper at the tip end thereof and a vertical axis at the inside thereof, an arm having an electrode at the upper end thereof and a lower end slidably engaged with the vertical axis, cylinder integrated with the arm 1 and having a cylinder rod, a movable arm having an electrode at the tip end thereof and pivotally connected to the tip end of the cylinder rod at the rear end thereof by a pin, a link for pivotally connecting the arm with the movable arm at the middle portions thereof by pins, the link having an engaging portion at the lower end thereof extending toward the stopper and a spring provided in a space between the lower end of the vertical axis and the lower end of the arm. The arm, as opposing the movable arm, can be equalized with ease.

5 Claims, 5 Drawing Sheets

WELDING GUN HAVING EQUALIZING FUNCTION

BACKGROUND OF THE INVENTION

1. Field of the Invention:

The present invention relates to an improvement of the welding gun.

2. Prior Art:

The, inventor of the present invention made an earlier welding gun which was patented U.S. Pat No. 4,879,447 as illustrated in FIG. 5.

The prior art welding gun comprises an arm 21 provided with an electrode, a movable arm 22 provided with an electrode, a link 23 pivotally connecting the arm 21 and the movable arm 22 at the middle portions thereof by pins 25, 26 and a cylinder 24 integrated with the arm 21 and provided with a rod 27 having a tip end connected to the movable arm, 22 at its rear end.

There is a problem in the prior art welding gun in that the electrodes do not satisfactorily confront each other when they are worn a work piece held by the electrodes is deformed due to inadequate equalizing whereby the pressing force is not satisfactorily applied to the work piece to result in deteriorated welding quality. For applying a satisfactory pressing force to the workpiece, both the electrodes are adjusted to be positioned correctly, which is however troublesome.

SUMMARY OF THE INVENTION

The present invention was made to solve the problems set forth above.

It is therefore an object of the present invention to provide a welding gun provided with an equalizing mechanism capable of eliminating adjustment between two electrodes so that the two electrodes can be correctly positioned even if the work piece is deformed, which improves the welding quality.

The above and other objects, features and advantages of the present invention will become more apparent from the following description taken in conjunction with the accompanying drawings.

PREFERRED EMBODIMENT OF THE INVENTION

Figure 1:
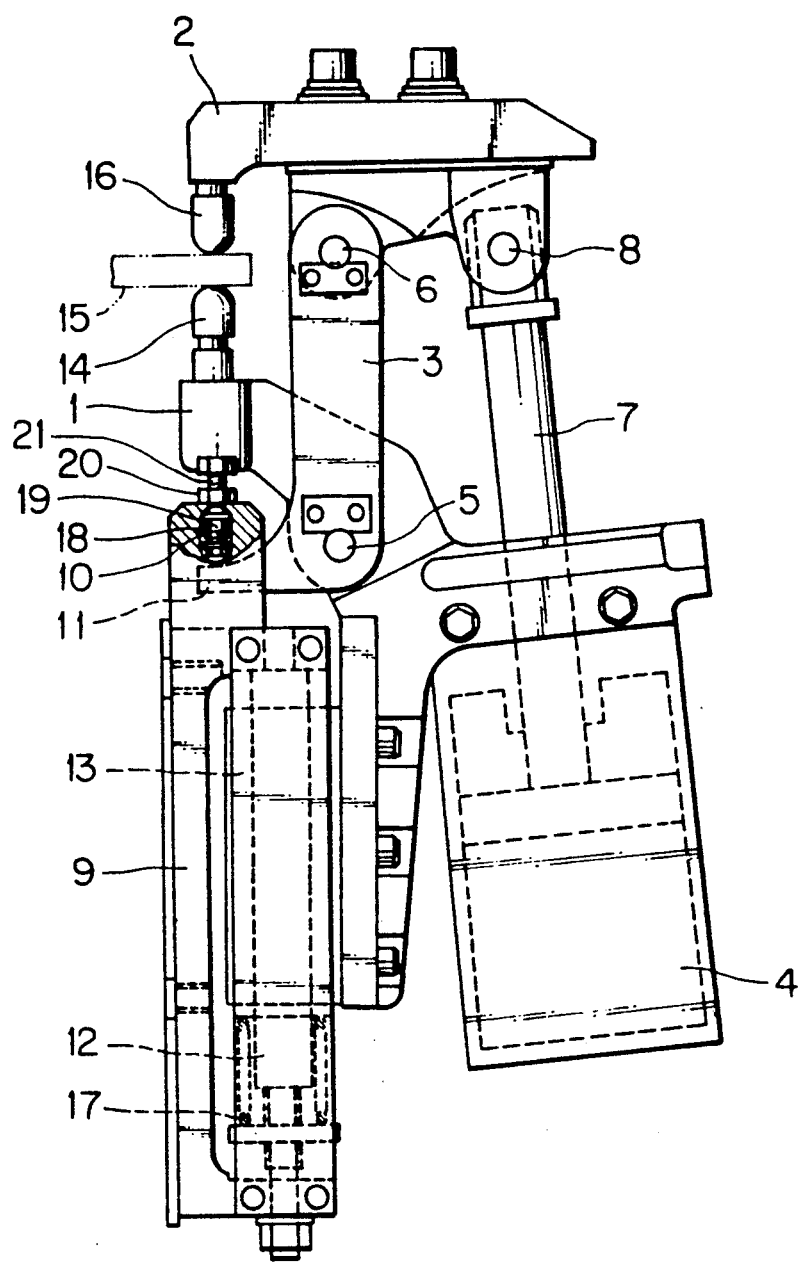
FIG. 1 is a side elevation of a welding gun according to a preferred embodiment of the present invention.

A welding gun according to a preferred embodiment of the present invention will be described with reference to FIGS. 1 to 4.

The welding gun comprises a base 9 having a stopper 10 at the tip end thereof and a vertical axis 12 defined inside thereof, an arm 1 having an electrode 14 at the upper end thereof and having a lower part 13 slidably movable along the vertical axis 12, a cylinder 4 integrated with the arm 1 and having a cylinder rod 7 slidably mounted therein, a movable arm 2 having an electrode 16 at the tip end thereof and pivotally connected at its other end to the tip end of the cylinder rod 7 by a pin 8, a link 3 for pivotally connecting the arm 1 with the movable arm 2 at the middle portions thereof by pins 5, 6, the link 3 having a lower end portion extending in the direction of the stopper 10 of the base 9 for forming an engaging portion 11, and a spring 17 provided in a space between the lower part 13 and the lower end of the base 9.

The arrangement will be described more in detail.

Designated at 1 is an equalizable arm comprising a tip end provided with the electrode, a middle part 13 having a through hole through which the pin 5 for pivotally mounting one end of the link 3 is provided and the lower portion having the cylinder 4 integrated therewith.

The link 3 is bent at a right angle to form the protruding engaging portion 11 which is directed toward the stopper 10 and can contact and engaging with the stopper 10.

The lower part 13 of the movable arm 1 is slidably movable along the vertical axis 12 and is always biased upward by the spring 17 which is housed in the space between the lower end of the base 9 and the lower part 13.

The movable arm 2 provided with the electrode 16 confronting the electrode 14 of the arm 1 has a middle portion having a through hole through which the pin 6 passes for pivotally mounting the other end of the link 3. The arm 2 has a rear portion through which the pin 8 passes for pivotally connecting the movable arm 2 with the tip end of the rod 7 of the cylinder 4.

Figure 2:
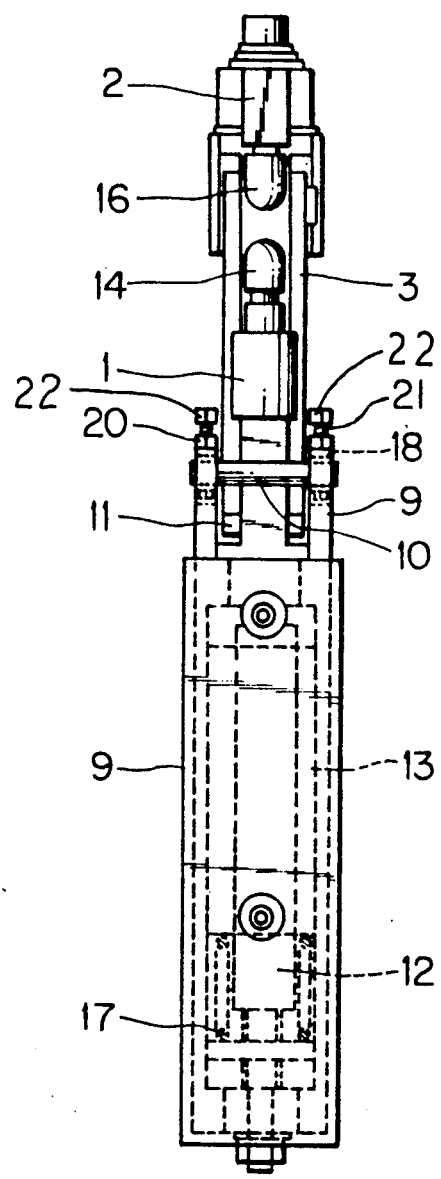
FIG. 2 is a front elevation of the welding gun of FIG. 1.

FIGS. 1 and 2 illustrate positions of the arms 1 and 2 at the time of completion of the welding work. At this state, when a fluid under pressure is supplied to an upper portion of a piston (illustrated in broken lines in FIG. 1) of the cylinder 4 and at the same time a fluid under pressure stored in a lower portion of the cylinder 4 is discharged, the rod 7 retracts linearly. Accompanied by the retraction of the rod 7 the pin 8 is lowered so that the rear end of the movable arm 2 moves downward linearly. Whereupon, since the movable arm 2 is connected to the link 3 by the pin 6 at the middle portion thereof, the pin 6 moves in a circular arc about the pin 5.

Figure 3:
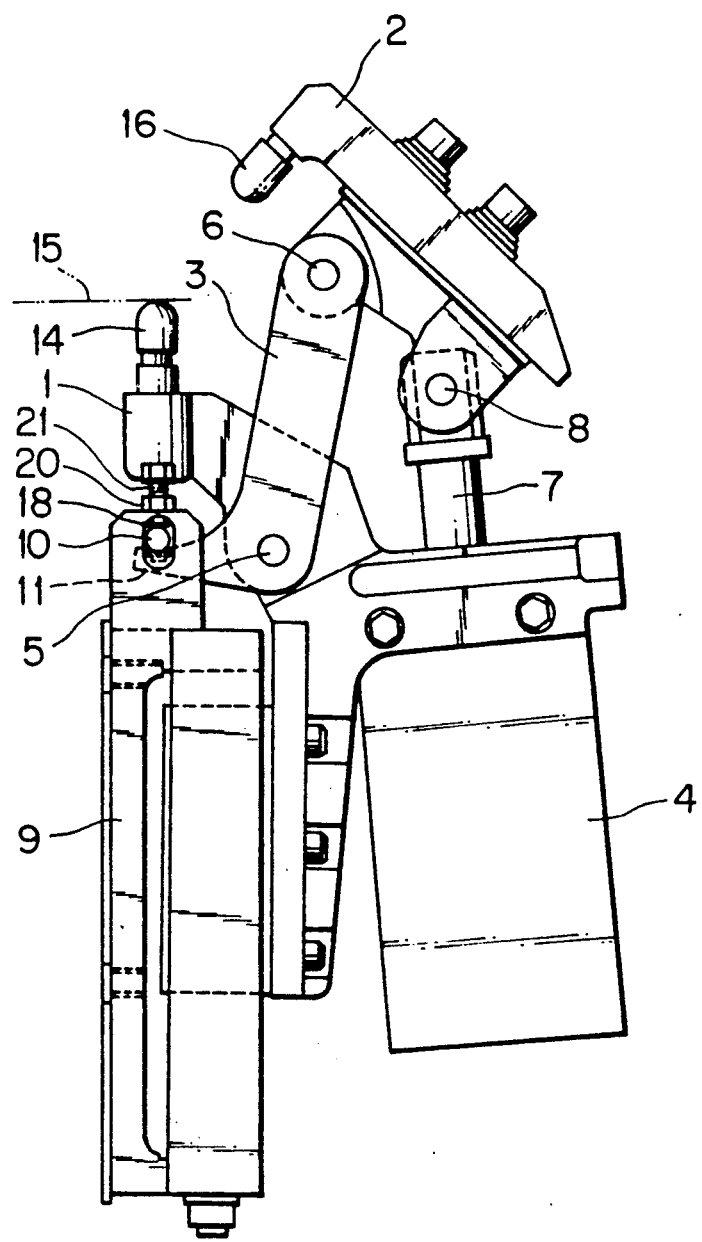
FIGS. 3 and 4 are views of assistance in respectively explaining the operations of the welding gun of FIG. 1.

Accordingly, the movement of the electrode 16 provided at the tip end of the movable arm 2 is a composition of the linear movement of the pin 8 and the simultaneous movement in the circular arc of the pin 6. The resultant movement or the composition of the movements of the pins 6 and 8 is illustrated in FIG. 3. The electrode 14 of the arm 1 does not move until the arm 2 is positioned at the state of FIG. 3. At the state of FIG. 3, the engaging portion 11 extended from the link 3 is brought into contact with the stopper 10.

Further retraction of the rod 7 from the state of FIG. 3 enlarges the distance between the arms 1 and 2, namely, the movable arm 2 is moved away from the arm 1. Inasmuch as the engaging portion 11 is brought into contact with the stopper 10, the lower portion 13 of the arm 1 slides along the vertical axis 12 against the urging force or resilience of the spring 17 so that the arm 1 is lowered together with the cylinder 4 and positioned at the state of FIG. 4. With the lowering operation of the arm 1, the electrode 14 of the arm 1 moves downwardly away from the work piece 15.

Figure 4:
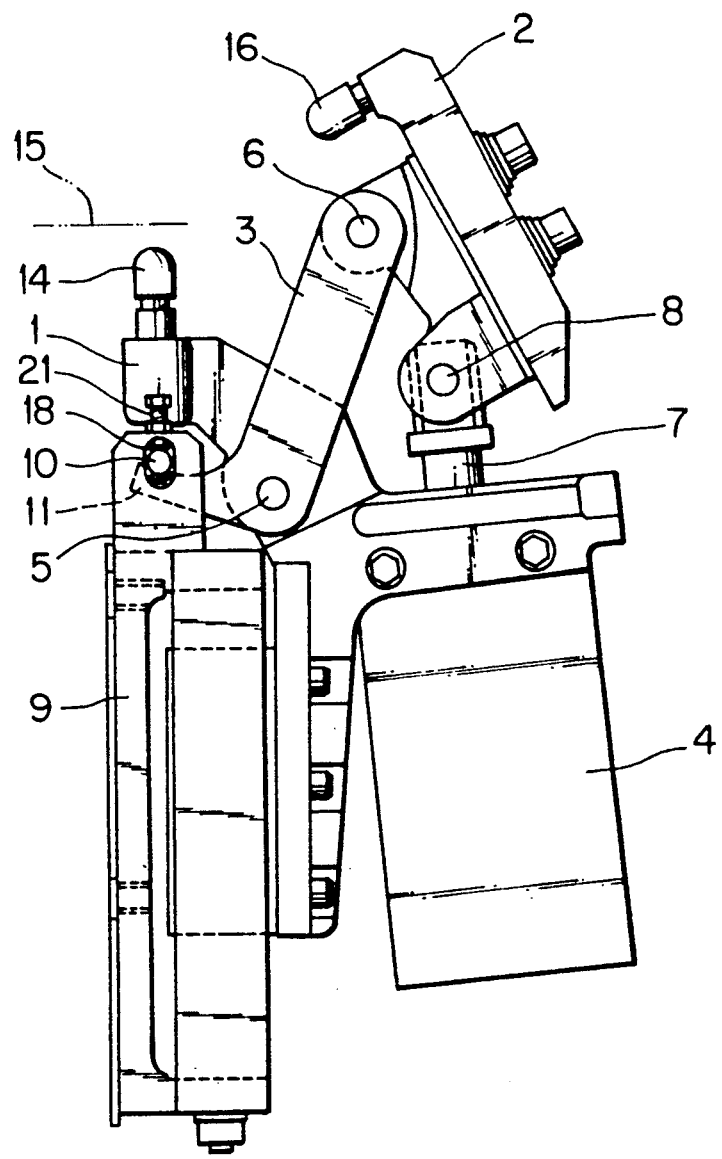
Figure 5:
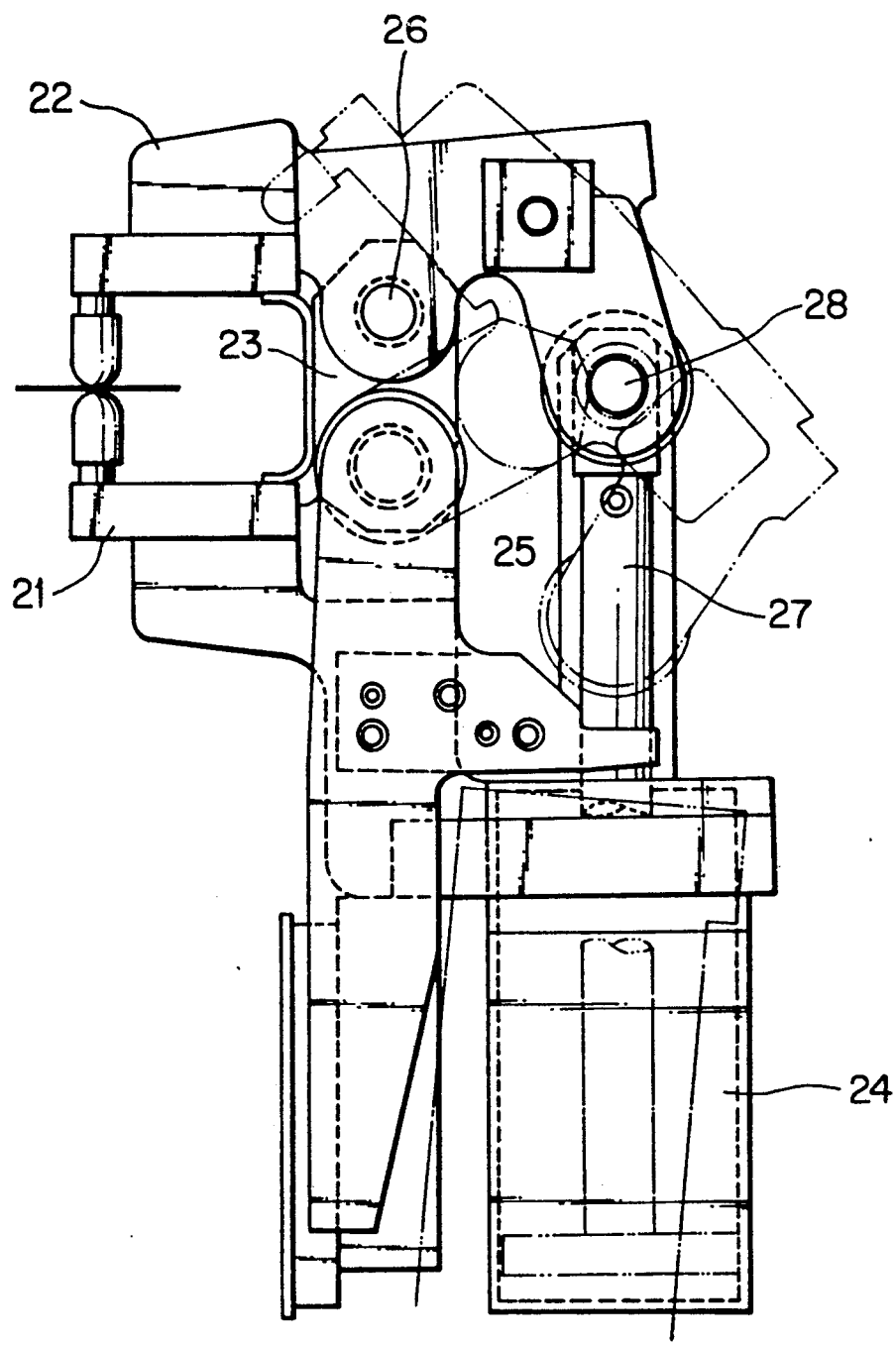
FIG. 5 is a side elevation of a prior art welding gun.

When the rod 7 moves upward from the state of FIG. 4, the movable arm 2 moves toward the arm 1 so that the electrode 14 of the arm 1 rises smoothly together with the aid of the urging force of the spring 17 until the electrode 14, is brought into contact, with the work piece 15 and positioned at the state of FIG. 3. With further upward movement of the rod 7, the engaging portion 11 is disengaged from the stopper 10, hence the rising or the upward movement of the electrode 14 is interrupted while only the movement of the movable arm 2 toward the arm 1 continues so that the arm 2 is positioned at the state of FIG. 1.

The welding gun further comprises a slit or elongated opening 18 defined an upper side wall portion of the base 9 so as to receive the stopper 10 therein, a pin 19 having a screwed portion 21 at the half upper portion thereof and a pin head 22 at the tip end thereof and rotatably engaged with the stopper 10, a nonrotatable nut 20 which is provided at the upper surface of the base 9 in threaded engagement with the threaded portion 21 of the pin 19. Accordingly, the pin 19 moves upward and downward relative to the nut 20 by rotating the pin head 22, hence the stopper 10 moves up and down together with the pin 19 within the length of the slit 18. With the upward and downward movement of the stopper 10, the timing of the engaging of the engaging portion 11 with the stopper 10 is adjusted so that the equalizing amount of movement of the arm 1 can be freely adjusted.

There are following advantages according to the present invention.

Inasmuch as the one link and three pivot pins are employed for moving the movable arm toward or away from the other arm, the numbers of parts are reduced and the arrangement of the welding gun becomes compact and miniaturized. Since the pressing force is applied to the work piece with the forward movement of the rod, the force applied to the piston in the cylinder becomes greater than the force applied to the piston at the time of retraction of the rod for the amount corresponding to the cross sectional area of the rod so that the pressing force can be applied sufficiently to the work piece, which permits reducing the size of the cylinder 4 or reducing the pressure of the operating fluid. Furthermore, inasmuch as the welding gun is provided with the equalizing mechanism, the positional adjustment of both the electrodes is eliminated and a welding operation of high quality can be achieved with simple mechanisms at all times in response to the deformation of the work piece. Still furthermore, since the springs are provided at the space between the lower end of the base and the lower end of the equalizing arm, the equalizing arm can rise smoothly so that the welding operation can be effectively carried out. Lastly, since the slit is provided in the base and the screw for engaging with the stopper is supported at the upper surface of the base and the stopper is moved up and down by rotation of the screw, the timing of the engagement of the engaging portion of the link with the stopper can be adjusted, which permits freely adjusting the equalizing amount of movement of the arm to thereby further enhance the welding operation.

Although the invention has been described in its preferred form with a certain degree of particularity, it is to be understood that many variations and changes are possible in the invention without departing from the scope thereof.

What is claimed is:

1. A welding gun, comprising:
    a base;
    a first welding arm supported on said base for sliding movement relative to said base along an axis of said base, said first welding arm having a welding electrode supported on one end thereof;
    spring means coacting between said base and said first welding arm for yieldably biasing said first welding arm toward a closed position;
    a fluid pressure cylinder which is fixed relative to said first welding arm, said fluid pressure cylinder including a rod which projects outwardly therefrom and which is slidably supported for reciprocal sliding movement relative thereto, said rod being slidably displaceable in response to pressurized fluid introduced into said fluid pressure cylinder;
    a second welding arm having one end pivotally connected to an external free end of said cylinder rod, said second welding arm having a second welding electrode supported on another end thereof;
    a link member extending between said first nd second welding arms, first and second spaced pivots respectively pivotally connecting said first nd second welding arms to said link member as extending therebetween, and said link member permitting said second welding arm to be driven by said slidable cylinder rod for movement relative to said first welding arm between an open position in which said second electrode is spaced from said first electrode and a closed position in which said second electrode is in closely opposed relationship with said first electrode; and
    means for interlocking said first and second welding arms at a predetermined time during opening movement of said second welding arm for causing said first welding arm to be locked and integrally carried with said second welding arm against the urging of said spring means for the remainder of said opening movement of said second welding arm.

2. A welding gun according to claim 1, wherein said welding arm interlocking means includes a stopper member mounted on said base, and ana engagement portion which projects from said link member toward said base, said engagement portion being disposed adjacent said stopper member and being contactable thereagainst during said opening movement of said second welding arm.

3. A welding gun according to claim 2, wherein said base includes a side wall having means defining an elongated opening therein, said stopper projecting outwardly through said elongated opening to permit contacting engagement with said engagement portion of said link member, said base also including an internally threaded nut and means for nonrotatably supporting said nut adjacent said stopper member but spaced therefrom in the elongate direction of said opening, an elongate pin extending generally in the elongate direction of said opening and having a threaded portion which is rotatably threadedly engaged within said nut, said elongate pin having one end portion which projects from said nut and is attached to said stopper member, said pin, as threadedly engaged with said nonrotatable nut, being rotatable to effect displacement of said stopper member in said elongate direction, said pin having another end portion which projects from said nut oppositely of said one end portion, said another end portion comprising an enlarged head for permitting manual rotation of said pin within said nonrotatable nut.

4. A welding gun according to claim 3, wherein said stopper member is an elongate rod-like member which extends transversely relative to said elongate direction, said base including a pair of said side walls having said elongated openings therein, said rod-like member extending between said openings and having opposite ends which respectively project outwardly therethrough, said base further including a pair of said nonrotatably supported nuts with a pair of said elongate pins respectively engaged therein, said pins being attached to said rod-like member adjacent respective said opposite ends of said member.

5. A welding gun according to claim 4, wherein said engagement portion of said link member projects from said link member adjacent said first pivot, said one end of said second welding arm being pivotally connected to said cylinder rod by a third pivot.

* * * * *